United States Patent [19]

Moran et al.

[11] Patent Number: 5,262,183

[45] Date of Patent: Nov. 16, 1993

[54] MANUFACTURE OF HIGH-SOLIDS PRE-CHEESE FOR CONVERSION INTO NATURAL CHEESE

[75] Inventors: James W. Moran, Lindenhurst; James R. Posdal, Glenview; Gary W. Trecker, Wheeling, all of Ill.

[73] Assignee: Kraft General Foods, Inc., Northfield, Ill.

[21] Appl. No.: 857,671

[22] Filed: Mar. 25, 1992

Related U.S. Application Data

[63] Continuation of Ser. No. 360,113, Jun. 1, 1989, abandoned, which is a continuation of Ser. No. 89,914, Aug. 24, 1987, abandoned.

[51] Int. Cl.$^5$ .................... A23C 9/142; A23C 19/00; A23C 19/05
[52] U.S. Cl. ........................................ 426/40; 426/36; 426/491
[58] Field of Search ............... 426/36, 40, 42, 491, 426/582

[56] References Cited

U.S. PATENT DOCUMENTS

| | | | |
|---|---|---|---|
| 3,899,596 | 8/1975 | Stenne | 426/40 |
| 3,914,435 | 10/1975 | Maubois et al. | 426/40 |
| 4,820,530 | 4/1989 | Moran et al. | 426/40 |

FOREIGN PATENT DOCUMENTS 8201806  10/1982  PCT Int'l Appl. ................ 426/40

OTHER PUBLICATIONS

Ernstrom, et al., J. Dairy Sci., vol. 63, 1980, pp. 228–234.

Primary Examiner—David M. Naff
Attorney, Agent, or Firm—Fitch, Even, Tabin & Flannery

[57] ABSTRACT

A high-solids pre-cheese for conversion into natural cheese is prepared by producing a retentate from milk, fermenting the retentate to a pH between about 4.8 and about 5.6 without coagulation, adding a milk clotting enzyme in a non-coagulating amount, evaporating moisture to a total solids content of more than about 55% to produce pre-cheese and holding the pre-cheese under curing conditions for conversion of at least about 65% kappa casein to para kappa casein. The milk clotting enzyme is preferably added immediately prior to evaporation. Evaporation is under highly turbulent conditions and product temperature in the evaporator preferably does not exceed 75° F. After evaporation, the pre-cheese is preferably held for 3 to 14 days for the conversion of kappa casein to para kappa casein.

10 Claims, No Drawings

MANUFACTURE OF HIGH-SOLIDS PRE-CHEESE FOR CONVERSION INTO NATURAL CHEESE

This application is a continuation of application Ser. No. 07/360,113 filed Jun. 1, 1989, now abandoned, which is a continuation of application Ser. No. 07/089,914, filed Aug. 24, 1987, now abandoned.

The present invention relates generally to the manufacture of cheeses or pre-cheese materials from milk and, more particularly, relates to a process for the manufacture of American-type cheeses, including cheddar-type cheeses, or pre-cheese materials therefor.

BACKGROUND OF THE INVENTION

The manufacture of cheeses or cheese base materials from milk through preparation of a retentate by removal of salts, lactose and water has been taught in various patents and literature references. For example, a patent to Coulter, et al., entitled "Cheese Manufacture from Molecular Sieved Milk," issued Oct. 26, 1976, U.S. Pat. No. 3,988,481, teaches the preparation of cheese from milk which has been de-lactosed and de-watered by a process involving molecular sieving a standardized milk to substantially separate and remove lactose and water-soluble minerals from the milk to render the milk substantially sugar-free, and adding a curd-forming agent to produce curd. The resulting curd is subjected to conventional handling without substantial syneresis to produce a cheese, and molded to a desired form.

A patent to Stenne, entitled "Method for the Manufacture of Cheeses," issued Aug. 12, 1975, U.S. Pat. No. 3,899,596, discloses a process for the production of cheese which comprises treating milk by ultrafiltration to obtain a product having at least some of the protein constituents of the milk, renneting the liquid product after inoculation with suitable ferments, and introducing a batch of the renneted liquid into a vertical chamber in which it is left to coagulate. The coagulum is cut into slabs which provide the end product cheese.

A patent to Maubois, et al., entitled "Manufacture of Cheese from Ultrafiltered Milk," issued Oct. 21, 1975, U.S. Pat. No. 3,914,435, teaches cheese made from heat-treated milk and without conventional draining of whey by a process which involves ultrafiltering of the milk to produce a concentrate having essentially the composition of cheese produced by conventional whey draining processes. The process enables the milk, after ultrafiltration, to be heat-treated without making the milk more difficult to coagulate with rennet, which difficulty normally occurs when milk is heated to high temperatures.

A patent issued to Wargel, et al., entitled "Process and Products from the Manufacture of Cheese-flavored Products," issued Jun. 13, 1981, U.S. Pat. No. 4,244,971, teaches the manufacture of cheeses and process cheese, from ultrafiltered milk.

A patent entitled "Process for Preparing Cheese base," issued Aug. 30, 1983, to Rubin, et al., U.S. Pat. No. 4,401,679, discloses a process for preparing cheese base by concentrating milk through ultrafiltration, combined with diafiltration and evaporation, wherein the retentate from the ultrafiltration is inoculated with an acid culture before evaporation, and after evaporation acidification proceeds to completion in packing.

Further, cheese base material has been taught by evaporating moisture from retentate under turbulent conditions to provide a lower moisture condition. Such a process is described in an article by Ernstrom, et al., entitled "Cheese base for Processing: a High-yield Product from Whole Milk by Ultrafiltration," published in the *Journal of Dairy Science*, volume 63, 228–234 (1980). The article teaches a process wherein whole milk of normal pH, or acidified to a pH of 5.7, is concentrated by ultrafiltration to about 40 percent of the original milk weight and diafiltered at constant volume until a desired ratio of lactose to buffer capacity is established. Then the retentate is further concentrated by ultrafiltration to 20 percent of the original milk weight. The retentate is then inoculated with cheese starter and incubated to completely ferment the residual lactose, pH control being achieved by controlling the level of lactose remaining after a diafiltration step in the process. The product is further concentrated in a swept-surface vacuum-pan evaporator or a continuous-flow Luwa evaporator. It is pointed out that the use of a batch evaporator is necessitated when the retentate, upon fermentation, curdles or coagulates, since such a product cannot be readily processed in any continuous-flow evaporator.

It is known to add salt during fermentation to prevent coagulation and this was understood many years ago. See: LeLait/November-December, 1974/No. 539–540. Further, it has been disclosed that salt in the retentate may facilitate evaporation as disclosed in an Australian patent application, which is the subject of a published application under the Patent Cooperation Treaty WO82/01806, published Jun. 10, 1982.

However, the prior art teaches that addition of rennet or other coagulating enzymes to high-solids milk systems causes rapid coagulation, a condition to be avoided during evaporation, as indicated above, since the evaporation is highly inefficient after coagulation occurs. On the other hand, the presence of coagulating enzymes is to be desired in hard or high-solids cheese to provide the conventional presence of para kappa casein. The kinetics of enzymatic coagulation of milk is disclosed by Alfred Carlson, in a thesis published in 1982, at the University of Wisconsin, entitled "The Kinetics of Enzymatic Coagulation of Milk."

In the conventional making of cheese with rennet, the macro peptides formed by rennet action are lost in the whey with consequent reduction in yield and loss of nutritious milk protein material. Accordingly, it would be desirable to enjoy the benefit of rennet action while avoiding whey removal with consequent loss of macro peptides.

Further, prior art methods for making cheese base materials at high-solids with evaporation, in which evaporation is effected with high turbulence or the cheese base material is recovered with substantial working after evaporation, has resulted in oiling-off or destabilization of higher-solids cheese base material, and a body and texture unlike various cheeses. This destabilization is particularly noticeable at total solids in excess of about 60 to 62 percent, e.g., a cheese such as cheddar cheese, but is also present at solids as low as 55 percent. Accordingly, cheese base materials heretofor produced by evaporating retentates to a total solids in excess of 60 percent have not provided the typical body and texture characteristics of high-solids cheeses.

Thus, the prior art teaches many different steps in respect to the manufacture of cheeses and cheese base materials from milk. However, much of the prior art is directed toward the manufacture of higher moisture or soft cheeses and it has not been directed toward the production of high-solids cheeses from retentates by means of evaporation. The difficulty which occurs with turbulence at higher-solids, i.e., above 55 percent total solids, is that the product destabilizes and exudes fat, and the product does not have characteristic cheese body and texture. At higher moistures, the fat has not been found to exude and the body and texture of soft cheeses can be provided.

While, as before indicated, the addition of milk clotting or coagulating enzymes to retentates has been known, such addition has generally been made with concurrent formation of a coagulum which cannot be readily subjected to evaporation, and which is destroyed by turbulence and working. Again, there is no provision of a stable high-solids cheese base material or cheese having the body and texture of conventionally made cheese.

Accordingly, despite the many teachings of the prior art relating to the manufacture of cheese base material and cheese from retentates derived from milk, there has been a serious lack of a process for producing higher-solids cheese which is stable and which can have the body and texture of American-type cheese.

For purposes of this application, the term "higher-solids cheeses" refers to cheeses which have a total solids in excess of 55 percent, whereas the term "high-solids cheeses" is used to refer to those cheeses which have a solids content in excess of 60 percent, and such cheeses are commonly referred to in the trade as hard cheeses. The cheeses having between 55 percent and 60 percent total solids are referred to herein as "semi-soft cheese." Also for purposes of this application, the term "milk" is meant to include raw whole milk, skim milk, and milk which has been standardized and which may have been pasteurized, clarified, and/or subjected to other appropriate treatment processes.

A material is called "cheese" herein when it has the body and texture of cheese, or when mechanical manipulation of the material provides cheese body and texture. Material is considered pre-cheese when it is being converted to cheese. On the other hand, a cheese base material is that material which does not have a typical cheese body and texture and which, upon mechanical manipulation, does not provide such body and texture.

A further object of this invention is to provide a higher-solids cheese which is stable and does not oil-off, and is manufactured by processing a retentate with evaporation techniques.

It is a principal object of this invention to provide a high-solids cheese from a retentate by means of evaporation techniques, the cheese being stable and capable of having the typical body and texture characteristics of high-solids cheese.

A still further object of this invention is the manufacture of a high-solids cheese using high turbulence and/or working of the product during or after evaporation, while providing a product having the characteristics of cheese.

Another object of this invention is to provide a higher-solids cheese in which there is formed a substantial percentage of para kappa casein in a process using evaporation.

Still another object of the invention is to provide a process for the manufacture of high-solids cheese using evaporation techniques in which the milk proteins have been subjected to the action of milk clotting enzyme but which process avoids loss of macro peptides.

A still further object of this invention is the provision of a pre-cheese made with turbulent evaporation or working of the material, which results in a product having the body and texture characteristics of cheese.

Still further objects and advantages of the invention will become apparent by reference to the following description.

GENERAL DESCRIPTION OF INVENTION

In accordance with this invention, milk is treated by known processes to provide a retentate having between about 83 percent and about 50 percent moisture; between about 0.7 percent and about 2.5 percent salts, based upon the salts in the milk; and less than 1.8 percent lactose. The retentates from whole milk will have a moisture between about 70 percent and about 50 percent, a salts level between about 1.0 percent and 2.5 percent, and a lactose level below about 1.8 percent. On the other hand, retentates from skim milk will have a moisture between about 83 percent and about 78 percent, a salts level between about 0.7 percent and about 1.9 percent, and lactose below about 0.6 percent. The fat content of the retentate can be adjusted by standardization of the milk or by addition of cream.

Various techniques are known in the art for achieving the indicated retentates, for example ultrafiltration, with or without diafiltration. Commercial apparatus is marketed and available for the preparation of such retentates, and the apparatus is in present use in the cheese industry. The operation of such apparatus is believed to be within the skill of the art. Preferably, in the practice of the invention, the milk is treated by ultrafiltration and diafiltration to provide the desired level of constituents in the retentate.

The total solids of the retentate should not be so high as to result in gelation of the retentate during processing and it has been found that the total solids content of the retentate made from whole milk, for best operation in the manufacture of American-type cheese, should be less than about 38 percent and should be greater than 30 percent. When the retentate is prepared from skim milk, for best operation, the total solids content of the retentate should be less than about 22 percent and should be greater than 17 percent. When the retentate is prepared from skim milk, it will be adjusted with cream being added to achieve a solids level in the mixture of between about 27 percent and about 33 percent for best operation.

The retentate, or adjusted retentate, is then fermented by mixing with conventional cheese cultures or starters, and particularly those commercially available and normally used in the manufacture of American-type cheeses, such as *Streptococcus lactis, Streptococcus cremoris*, and other well known organisms. The term American-type cheese is meant to include cheddar cheese. The retentate may have enzymes added to enhance flavor in the end product, such as certain lipases and proteases which hydrolyze fat and protein in the retentate. The enzymes also reduce viscosity in the system which serves to avoid gelation in the process. These enzymes are known to the cheese industry and their addition has been previously disclosed in the manufacture of cheese.

The fermentation is continued until the acid in the retentate has lowered the pH to the range of between about 4.8 and about 5.6. The pH can be controlled by adjusting the lactose level in the preparation of the retentate. Stated another way, the cheese cultures serve to convert the lactose to lactic acid, thereby increasing the acid and lowering the pH. Again, it is important that the fermentation be controlled in such a manner as to prevent coagulation. This may be achieved in different ways as by having lower total solids in the retentate or, as has been known for many years, by the inclusion of salts, such as sodium chloride, at the fermentation step.

The fermented retentate is then mixed with a milk clotting enzyme commonly used in cheese manufacture and widely available commercially. Perhaps the best known milk clotting enzyme in cheese making is veal rennet. However, a number of other milk clotting enzymes are known in the cheese industry, as for example, microbial rennets, such as *Mucor meheii*. These enzymes are known to cause conversion of kappa casein to para kappa casein in cheese by their action upon kappa casein in the milk. Equivalents to these well known milk clotting enzymes can be utilized if they effect the conversion of kappa casein like the milk clotting enzymes. In conventional cheese making, the coagulating enzymes cause clotting of milk with substantially all of the para kappa casein being formed in the vat coincident with the setting of the milk. Also, the milk clotting enzymes form macro peptides which in conventional cheese manufacture are substantially removed with the whey. When the milk solids are increased, the prior art teaches more rapid coagulation and quicker formation of para kappa casein.

In the process of this invention, coagulation is to be avoided prior to provision of the end product, but it has been found that para kappa casein is necessary to provide a stable end product, and, in the case of high-solids cheese, typical cheese body and texture. What has been discovered is that the milk clotting enzymes can be added in such low amounts that coagulation is avoided and yet para kappa casein develops in the end product to sufficient levels to provide desired stability, and cheese body and texture.

The amount of milk clotting enzyme added should be less than a coagulating amount, but should be in an amount which will convert at least about 65 percent of the kappa casein to para kappa casein. The percent of kappa casein conversion is determined by first measuring the amounts of para kappa casein and kappa casein in accord with the procedure reported in *Journal of Dairy Science*, Vol. 64, Supplement 1 (1981) at page 63; and then calculating the percentage by the following formula:

Percent of kappa casein conversion =

$$\frac{1.5 \times (\text{Amount of p. kappa casein})}{(\text{Amt. of kappa casein}) + 1.5 \times (\text{Amt. of p. kappa casein})} \times 100$$

The particular amount of milk clotting enzyme added will vary, depending upon the specific enzyme used and its activity under the conditions of the process. We have found that, for desired commercial operations, the amount used should cause at least about 65 percent of the kappa casein to be converted to para kappa casein in about three days but less than 14 days after pre-cheese is produced out of the evaporator. In the case of some milk clotting enzymes, it is necessary to continue holding the product after the indicated conversion to achieve texturization.

The milk clotting enzyme is desirably introduced after fermentation but before evaporation to higher-solids levels. Preferably, the milk clotting enzyme is introduced immediately before evaporation.

This invention contemplates evaporation with concurrent highly turbulent conditions occurring throughout water removal or with substantial working of the product after evaporation. This will normally occur in a swept-surface evaporator, such as a Turba-Film evaporator or a Luwa evaporator, or after evaporation on a vacuum drum drier, such as a Blaw-Knox vacuum drum drier system. These turbulent conditions tend to destabilize the product; and high-solids product out of the evaporator, if pressed or squeezed, exudes fat and does not provide, at this point, a product having typical cheese body and texture.

During evaporation, it is desirable that the temperature of the product not exceed 75° F. for a number of reasons. Excessive temperatures result in bacterial inactivation, or die off, and reduced bacterial activity, as well as reduced enzyme activity. Further, high temperatures can affect the casein and salts in the system. It has been found that the pre-cheese temperature may increase in the system used for product removal and should be collected from the evaporator at a temperature of below about 85° F. The product can be collected in a barrel or other container. The product should be cured by quickly cooling as by placing the barrel or container in a 45° F. storage room. This product is considered to be pre-cheese. As indicated, the pre-cheese should be retained under curing conditions until at least about 65 percent of the kappa casein has been converted to para kappa casein, whereupon it is considered cheese.

Other types of evaporators than swept-surface evaporators, may be used and, while evaporation may be achieved under less turbulent conditions, these types normally collect the product under conditions which manipulate or work the product in an auger conveyor, or the like, and result in destabilization. This may be a part of a Blaw-Knox vacuum drum drier system. Therefore, these collected pre-cheeses must likewise be retained for 65 percent kappa casein conversion to provide cheese.

The high-solids cheese may then be texturized to provide cheese body and texture. On the other hand, if the cheese of the invention is to be used in process cheese manufacture, the texturization step becomes unnecessary, and the pre-cheese or cheese can function in such manufacture in the same manner as cheese made by conventional methods or by the texturization disclosed herein. The semi-soft cheeses may have the body and texture desired, but the para kappa casein provides improved stability.

Various pieces of equipment can be used to effect texturization, but basically, it has been found that the cheese needs to be worked under controlled temperature and manipulative conditions to provide cheese body and texture. During texturization the temperature should be in excess of 105° F. to incorporate fat and should be manipulated at between about 125° F. and 160° F. until an elastic body is achieved.

The texturability of the cheese can be determined by the following test:

Forty pounds of untexturized cheese at a temperature between 50° F. and 60° F. is introduced into a Day Mixer employing a sigma blade agitator. A jacketed mixing bowl is provided with 10 psig steam (238° F.) being present in the jacket. The Day Mixer is operated at maximum speed of about 135 rpm. The cheese initially becomes oily, yellow and granular but, if texturizable, reincorporates the fat at about 110° F. and achieves a mashed-potato appearance. At about 140° F., the fat is fully reincorporated and the cheese is stringy, elastic and rubbery. The speed is reduced to about 50 rpm and at about 142° F. the cheese masses together, whereupon it is hooped and pressed for one-half hour at 15 psig, with no exuding of oil. The pressed cheese is stored at 45° F. and, when cooled down, has the body and texture of conventionally made cheese.

This test serves to establish texturability of the product of this invention.

Salt is sometimes a necessary ingredient in the cheese. The term "salt," of course, includes salt substitutes. The salt can function in a number of ways in the process, but can also interfere with various operations. As pointed out, salt may be added during fermentation to limit coagulation, but excessive salt can affect bacterial growth during fermentation. Salt can be added prior to evaporation and improve evaporation efficiency by lowering viscosity, but is not necessary to efficient evaporation. Further, salt can be added during evaporation or after evaporation as in conventional cheese manufacture. Thus, salt may be added at several points in the process. Salt may destabilize the cheese at high levels. In any event, salt is added in an amount(s) which provides an end salt content typical of the cheeses being made.

The practice of the invention will be more clearly understood by reference to the following examples.

EXAMPLE I

Raw whole milk is stored at 40° F. and is standardized to a desired protein-to-fat ratio of about 0.78. Standardization is achieved by the addition of cream or the removal of cream. Cream which is heat-treated at 175° F. for sixteen seconds is used when addition is necessary. The standardized milk is then pasteurized at 162° F. for sixteen seconds, cooled, and held at 40° F.

The standardized milk is subjected to ultrafiltration to achieve a concentration of 4.75-fold, and then is diafiltered. The diafiltration is run at about 1.5 to 1 (water-to-concentrate). After diafiltration, ultrafiltration is continued until about 5.28-fold concentration, based upon the original milk volume, is achieved. The ultrafiltration-diafiltration process is conducted to achieve a lactose level of about 0.9 percent, so that the pH reduction during fermentation will be limited to about 5.2, and to provide milk salts or ash at a level of about 1.3 percent. The retentate has about 35 to 38 percent total solids.

The concentrated retentate is pasteurized at 165° F. for sixteen seconds and cooled to 60° F. and held in an agitated tank at about 60° F. until needed for fermentation. The maximum storage time at this temperature is less than sixteen hours. A temperature of 60° F. is employed because lower temperatures increase viscosity to unacceptable levels for the process. The retentate is found to be microbiologically stable under these storage conditions.

The concentrated retentate is then warmed to 70° F. for fermentation. A salt (sodium chloride) solution is added at a level of 0.4 percent (by weight of salt-to-retentate) to limit coagulation during fermentation. A conventional lactic starter culture is used, specifically, Hansen's Direct Vat Set 970, for effecting the fermentation. The culture is used at a level of about 0.24 milliliters per pound of retentate at 35 percent total solids. Pregastric esterases (lipase) are added. These enzymes are obtained from Dairyland Food Laboratories, Inc. The pregastric esterases are added at a level of about 0.043 grams per pound of retentate at 35 percent total solids.

The fermentation is carried out at 70° F. for ten-twelve hours and until the fermented retentate reaches a pH of 5.2. After fermentation, 0.515 percent salt (sodium chloride) based on the weight of retentate, is added, so as to bring the final salt in the cheese, at 65 percent solids, to about 1.7 percent. After the desired pH level is achieved, the temperature of the fermented retentate is lowered to 60° F.

The fermented retentate is at a solids level of about 34.5 percent total solids and is then concentrated in a swept surface evaporator, specifically a Turba-Film evaporator, with a positive pump discharge.

A milk clotting enzyme, specifically Novo Rennilase TL, a modified *Mucor meheii* enzyme, is added to the fermented retentate immediately prior to evaporation. The milk clotting enzyme is added to a concentration of 0.01 percent based on cheese and there is no coagulation or undue thickening of the fermented retentate. Further, no significant amount of para kappa casein is formed prior to evaporation.

The Turba-film evaporator is operated so that the temperature of the product in the evaporator is between about 65° and 75° F. with a vacuum of between about 16 and about 22 millimeters of mercury absolute pressure.

The pre-cheese out of the Turba-film evaporator is collected under a vacuum to remove air and increase density, and filled into barrels.

The barrels, after filling, are placed in a 45° cooler, and can be used directly in the manufacture of cheese, or after conversion of about 75 percent kappa casein to para kappa casein in about six days, can be texturized. Texturization can be effected in various units.

The cheese has a total solids of 65.0 percent, a fat of 34.1 percent, a protein of 26.7 percent, a salt (sodium chloride) of 1.7 percent and an ash of 4.0 percent. There is less than 0.1 percent lactose in the cheese.

EXAMPLE II

The fermented retentate of Example I is prepared and evaporated in the Turba-Film evaporator to a total solids concentration of 45 percent at the temperature and vacuum specified in Example I. The pre-concentrated retentate is then evaporated in a Blaw-Knox vacuum double-drum drier at a vacuum of 22 millimeters absolute with the average temperature of the product not exceeding 75° F. The product is doctored off of the drums and collected in an auger conveyor for removal from the evaporator as pre-cheese.

The pre-cheese does not have a significant amount of para kappa casein, but on storage for 6 days, 75 percent of the kappa casein is in the form of para kappa casein. The cheese has a total solids of 65.0 percent, a fat of 34.1 percent, a protein of 26.7 percent, less than 0.1 percent lactose, and ash of 4.0 percent. The salt is at 1.7 percent.

EXAMPLE III

The fermented concentrate of Example I is processed in accord with Example II, except that the fermented retentate was not first concentrated in the Turba-Film evaporator. A cheese like that in Example II results.

EXAMPLE IV

The cheese of Example I with a 75 percent conversion of kappa casein to para kappa casein is mechanically manipulated in such manner as to provide cheese body and texture. Specifically, the cheese is introduced into a Farinograph Sigma blade mixer with hot water supplied to its jacket at 160° F. 500 grams of cheese is introduced at 58° F. and pH of about 5.2. The Farinograph mixer is run at maximum RPM with the following results:

| TIME/ MINUTES | TEMPERATURE | COMMENTS |
|---|---|---|
| Start | 58° F. | Crumbly, non-cohesive |
| 1 min. | 91° F. | Oily, Yellow |
| 3 min. | 111° F. | Oil re-incorporated "Mashed potato" appearance |
| 4 min. | 131° F. | Firming-up |
| 5 min. | 142° F. | Texturized, elastic pieces |

The texturized product has a sheen and is elastic, rubbery, and stretchable. The cheese is pressed for one-half hour at 10 psig without oiling off.

EXAMPLE V

Cheese from Example I is introduced into a Werner-Pfleiderer twin-screw extruder having eleven sections. The cheese is fed into the extruder at a pressure of 6.5 psig at a rate of three pounds per minute. The cheese is heated to 145° F. with manipulation and cooled to 135° F. before extrusion. The cheese is like that produced by Example IV.

EXAMPLE VI

Skim milk is pasteurized at 161° F. for 16 seconds and subjected to ultrafiltration to achieve a concentration of 5.0 fold, and then is diafiltered. The diafiltration is conducted to achieve a lactose level of about 0.1 percent. The diafiltration is conducted at about 4 to 1 (water to concentrate) yielding a final retentate which has about 17.5 percent total solids.

The concentrated retentate is pasteurized at 165° F. for 16 seconds and cooled to 90° F. The pasteurized skim milk is standardized to a desired solids-not-fat to fat ratio of about 0.9. Standardization is achieved by the addition of pasteurized cream (45 percent milk fat) at 45° F. The final retentate plus cream mix contains a lactose level of about 0.9 percent, thus limiting pH reduction during fermentation to about 5.0. The retentate plus cream mix has about 27 percent total solids.

The unfermented retentate plus cream mix is fermented and processed in accord with Example I.

EXAMPLE VII

The procedure of Example I is followed, except that the milk clotting enzyme is changed in accordance with the following table and the percent conversion of kappa casein to para kappa casein is indicated at the specified days of storage.

| MILK CLOTTING ENZYME | LEVEL OF ADDITION PERCENT OF CHEESE | PERCENT CONVERSION | DAYS |
|---|---|---|---|
| Hansen's Bovin (bovine rennet) | 0.0015 | 85 | 5 |
| Calf Rennet | 0.001 | 73 | 7 |
| Hannilase, HL* | 0.01 | 88 | 7 |
| Rennilase TL* | 0.01 | 80 | 7 |
| New Marzyme* | 0.01 | 85 | 6 |
| New Marzyme* | 0.025 | 77 | 6 |
| Hansen's 50/50** | 0.0018 | 80 | 7 |
| Bovine Pepsin | 0.0009 | N.A. | 5 |

| MILK CLOTTING ENZYME | LEVEL OF ADDITION PERCENT OF CHEESE | PERCENT CONVERSION | DAYS |
|---|---|---|---|
| Bovine Pepsin | 0.0009 | 85 | 12 |

*Modified *Mucor meheii* enzyme
**Calf rennet 50%, porcine pepsin 50%

At the indicated days, the cheese texturized when processed in accord with Example IV.

EXAMPLE VIII

The procedure of Example I is followed except that the addition of sodium chloride is omitted from the fermentation step and an equivalent amount of sodium chloride is added after fermentation and prior to evaporation so that the cheese from the evaporator has a salt (NaCl) content of about 1.7 percent.

EXAMPLE IX

The procedure of Example I is followed except that the addition of sodium chloride is omitted from the fermentation step and before evaporation. Further, dry salt (NaCl) is added to the product out of the evaporator in a ribbon blender to effect uniform distribution of the salt. The dry salt is added to provide a cheese having about 1.7 percent salt.

In summary, the invention provides higher-solids cheese in high yield by alternate make procedures. The high-solids cheese has equivalent composition to a comparable standardized cheese and also is texturizable to the body and texture of comparable standardized cheese. The cheese produced is distinguishable from prior known processes in which retentates are evaporated to higher-solids and is uniquely different from such prior known processes and the products resulting therefrom in the utilization of milk clotting enzymes and the establishment of high levels of para kappa casein after evaporation. Further, the cheese is distinguishable from the product of previously known processes utilizing evaporation to high-solids levels in that it is texturizable to the body and texture of cheese made in vats.

The various features of the invention which are believed to be new are set forth in the following claims:

What is claimed is:

1. A process for the manufacture of pre-cheese for conversion into natural cheese having total solids in excess of 55 percent from milk comprising the steps of:
   a. removing moisture, salts and lactose from the milk to provide a retentate having between about 50 percent and about 83 percent moisture, between about 0.7 percent and about 2.5 percent salts, and less than about 1.8 percent lactose;
   b. adding cheese-making cultures to the retentate and fermenting the retentate to a pH of between about 5.6 and about 4.8 without coagulation;
   c. adding a milk clotting enzyme immediately prior to evaporation and in a non-coagulating amount but in an amount sufficient to convert at least about 65 percent of the kappa casein to para casein after evaporation and during curing;
   d. evaporating moisture in an evaporator under highly turbulent conditions at a product temperature in the evaporator not to exceed about 75° F. to a total solids content of more than about 55 percent to provide a pre-cheese; and e. holding the pre-cheese under curing conditions until at least about 65 percent of the kappa casein has been converted to para kappa casein and the pre-cheese is texturizable to provide a natural cheese body and texture.

2. A process in accordance with claim 1 in which salt is added at fermentation, prior to evaporation, during evaporation, and/or after evaporation.

3. A process in accordance with claim 1 in which evaporation of moisture is effected to a total solids content of more than about 60 percent.

4. A process in accordance with claim 1 in which the milk used is whole milk and the retentate has moisture of between about 50 percent and about 70 percent and salts of between about 1.0 percent and 2.5 percent.

5. A process in accordance with claim 1 in which a skim milk retentate is prepared having a moisture between about 78 percent and about 83 percent, a salts level between about 0.07 percent and about 1.9 percent, and lactose below about 0.6 percent; and the retentate is mixed before evaporation with milk fat.

6. A process in accordance with claim 1 wherein the pH after fermentation is about 5.2.

7. A process in accordance with claim 1 wherein the pre-cheese is texturized by manipulation at temperatures above about 125° F. until cheese body and texture is achieved.

8. A process in accordance with claim 1 wherein lipase is added to the retentate before evaporation.

9. A process in accordance with claim 1 wherein at least about 65 percent of the kappa casein is converted to para kappa casein within 3 to 14 days.

10. A process in accordance with claim 1 wherein the product temperature in the evaporator is in the range of from about 65° F. to about 75° F.

* * * * *